(12) United States Patent
Williams et al.

(10) Patent No.: US 10,728,136 B2
(45) Date of Patent: Jul. 28, 2020

(54) MCELLBLOCK FOR PARALLEL TESTING OF MULTIPLE DEVICES

(71) Applicant: Mobile Integration Technologies, Bellevue, WA (US)

(72) Inventors: Marcus J. Williams, Bellevue, WA (US); Matthew Gambardella, Redmond, WA (US); Stephen L. Moody, Maple Valley, WA (US); Aaron Magi, North Saanich (CA)

(73) Assignee: Mobile Integration Technologies, Bellevue, WA (US)

( * ) Notice: Subject to any disclaimer, the term of this patent is extended or adjusted under 35 U.S.C. 154(b) by 70 days.

(21) Appl. No.: 15/938,501

(22) Filed: Mar. 28, 2018

(65) Prior Publication Data
US 2018/0287926 A1 Oct. 4, 2018

Related U.S. Application Data (60) Provisional application No. 62/478,367, filed on Mar. 29, 2017.

(51) Int. Cl.
*H04L 12/24* (2006.01)
*H04L 12/26* (2006.01)

(52) U.S. Cl.
CPC ............ *H04L 43/50* (2013.01); *H04L 41/082* (2013.01); *H04L 41/0813* (2013.01)

(58) Field of Classification Search
None
See application file for complete search history.

(56) References Cited

U.S. PATENT DOCUMENTS

| | | | | |
|---|---|---|---|---|
| 9,727,545 | B1* | 8/2017 | Segalis | G06F 17/24 |
| 2013/0218509 | A1* | 8/2013 | Schroeder | G06F 11/263 |
| | | | | 702/123 |
| 2015/0089299 | A1* | 3/2015 | Gittelman | G06F 11/3688 |
| | | | | 714/38.14 |
| 2016/0004628 | A1* | 1/2016 | Gugri | G06F 11/3688 |
| | | | | 717/124 |
| 2017/0139680 | A1* | 5/2017 | Proctor | G06F 8/20 |
| 2018/0049051 | A1* | 2/2018 | Doshi | H04W 24/06 |

\* cited by examiner

*Primary Examiner* — Brandon M Renner
(74) *Attorney, Agent, or Firm* — SBMC (57) ABSTRACT

Techniques for parallel testing of multiple mobile devices simultaneously at an MCellblock are described. In one example, an MCellblock receives a request to perform a test run on multiple mobile devices located at the MCellblock. The request includes multiple test scripts that can be used by the MCellblock to execute a test run on each of the multiple mobile devices. The MCellblock creates a thread for each of the multiple mobile devices to perform the test run. Then, the MCellblock performs the test run on each of the multiple mobile devices located at the MCellblock simultaneously via each of the threads. Performing the test run includes executing a test script on each of the respective multiple mobile devices. The MCellblock monitors the multiple mobile devices as the test run is performed for results of the test run, and outputs the results of the test run.

20 Claims, 7 Drawing Sheets

MCELLBLOCK FOR PARALLEL TESTING OF MULTIPLE DEVICES

RELATED APPLICATION

This application claims priority to U.S. Provisional Application Ser. No. 62/478,367, filed Mar. 29, 2017, entitled "MCellblock for Parallel Testing of Multiple Devices", the disclosure of which is hereby incorporated by reference in its entirety.

BACKGROUND

Before a new mobile device or application to be deployed on mobile devices is released, the entity executing the release wants to be sure that their device or application executes as close to perfectly in every situation as possible. Current systems for testing mobile devices and applications on mobile devices typically only test a single device at a time. Only testing one device at a time, or very few devices at a time, is slow and can lead to inconsistencies and inaccuracies in testing results, and reduces the likelihood that the mobile device or application will run smoothly once released.

SUMMARY

Techniques for parallel testing of multiple mobile devices simultaneously at a single computing device, referred to herein as a "cellblock" or "MCellblock" are described. In one example, an MCellblock receives a request to perform a test run on multiple mobile devices located at the MCellblock. The request may be received from a service provider system, for example. The request includes multiple test scripts that can be used by the MCellblock to execute a test run on each of the multiple mobile devices. The MCellblock creates a thread for each of the multiple mobile devices to perform the test run. Then, the MCellblock performs the test run on each of the multiple mobile devices located at the MCellblock simultaneously via each of the threads. Performing the test run includes executing a test script on each of the respective multiple mobile devices. The MCellblock monitors the multiple mobile devices as the test run is performed for results of the test run, and outputs the results of the test run, such as to a service provider system that sent the original request.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Current systems for testing mobile devices and applications on mobile devices typically only test a single device at a time. Only testing one device at a time, or very few devices at a time, can lead to inconsistencies and inaccuracies in testing results, and reduces the likelihood that the mobile device or application will run smoothly once released.

Accordingly, techniques and systems are described for parallel testing of multiple mobile devices simultaneously at a single computing device, referred to herein as a "cellblock" or "MCellblock." The MCellblock houses multiple mobile devices and provides an environment for testing and configuration of the multiple mobile devices, including an interface to remote systems that generate requests for test runs of the mobile devices located at the MCellblock. Further, the MCellblock can automatically select a subset of the mobile devices that the MCellblock houses when the MCellblock receives a request from a remote system for a test run based on parameters contained in the request.

In a first example, a user may design a test run at a computing device to be implemented on multiple mobile devices, such as through interactions with a user interface. The test run may relate to network configuration settings, device configuration settings, a new application that is to run on a particular type of device, and so forth. The computing device generates a request to perform the test run on a number of mobile devices. Performing the test run on multiple mobile devices gives the user a better idea of how their configuration settings, new application, and so on will perform when it is subsequently released to a broader audience.

The request to perform the test run includes test configuration data, an indication of multiple mobile devices to perform the test run, and a test script to be run on the indicated multiple mobile devices. The test configuration data can include device parameters, network settings, accessible applications, and so forth. The indication of the multiple mobile devices to perform the test run may include multiple devices located at a single MCellblock or multiple devices that are located at several different MCellblocks. The test script to be run on the indicated multiple mobile devices details execution of the test run and what each of the mobile devices is to perform during the test run.

Based on the indication of which mobile devices are to perform the test run, the computing device identifies MCellblocks where particular mobile devices are located. For instance, if the request includes identification of particular mobile devices that have a certain application installed, the computing device can identify MCellblocks that are housing the particular mobile devices with the application installed and disregard MCellblocks that do not house mobile devices with the application installed.

The computing device outputs the request to perform the test run to the MCellblocks that were identified. Outputting the request enables the MCellblocks that receive the request to run the test script on the indicated multiple mobile devices simultaneously based on the test configuration data. Continuing with the above example, outputting the request enables the MCellblocks that are housing the particular mobile devices with the application installed to perform the test run on the particular mobile devices simultaneously, even if the particular mobile devices are located at different MCellblocks.

In another example, a computing device, such as an MCellblock, receives a request to perform a test run on multiple mobile devices located at the MCellblock. The request includes multiple test scripts to execute the test run on each of the multiple mobile devices. The multiple mobile devices may include all of the mobile devices located at the MCellblock, or may include a subset of all of the mobile devices located at the MCellblock. The MCellblock creates a thread for each of the multiple mobile devices to perform the test run. For instance, there may be one thread for a first mobile device to perform the test run with a first set of parameters, a second thread for a second mobile device to perform the test run with a second set of parameters, and so on.

The MCellblock performs the test run on each of the multiple mobile devices located at the computing device simultaneously via each of the threads. Performing the test run includes executing a test script on each of the multiple mobile devices. The test scripts executed on each of the multiple mobile devices may be the same test script for each mobile device, or may vary from mobile device to mobile device. While the test run is being performed by the MCellblock, the MCellblock monitors the multiple mobile devices for results of the test run. Results may include, for example, a video capture of the test run, screen shots of the test run, performance metrics during the test run, network activity during the test run, and so forth. The MCellblock then outputs the results of the test run, such as to a service provider system and/or a computing device from which the MCellblock received the request. By creating individual threads to perform and monitor the test run, more results can be obtained from the test run at once, providing timely, more accurate and significant results.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
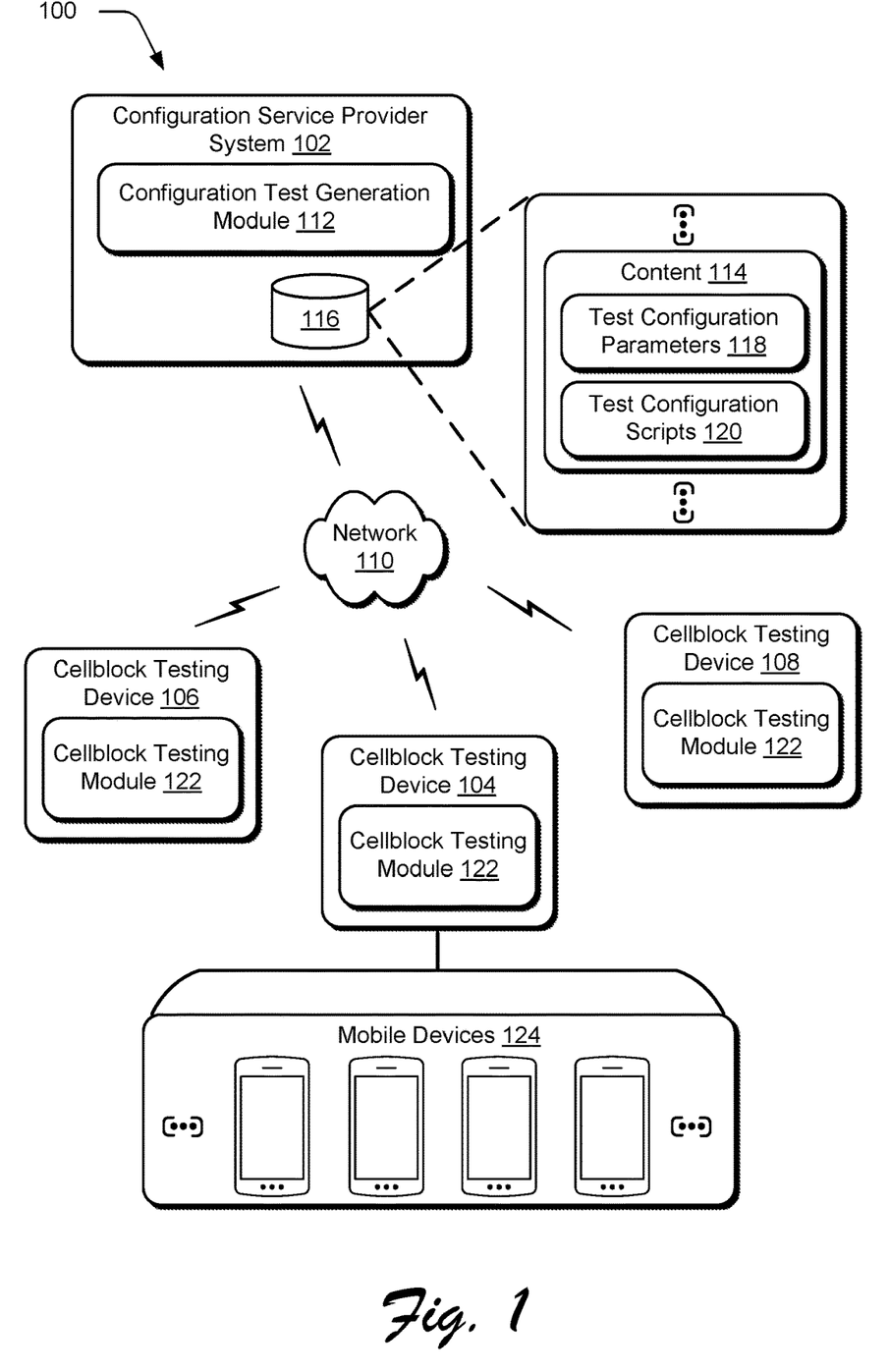
FIG. 1 is an illustration of an environment in an example implementation that is operable to employ parallel testing of multiple devices techniques described herein.

FIG. 1 is an illustration of a digital medium environment 100 in an example implementation that is operable to employ techniques for parallel testing of multiple devices in a cellblock as described herein. The illustrated environment 100 includes a configuration service provider system 102 and cellblock testing devices 104, 106, and 108 that are communicatively coupled, one to another, via a network 110. Computing devices that implement the configuration service provider system 102 and the cellblock testing devices 104, 106, and 108 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the configuration service provider system 102, and as further described in FIG. 7.

The configuration service provider system 102 is illustrated as including a configuration test generation module 112 that is implemented at least partially in hardware of a computing device. The configuration test generation module 112 is configured to manage online interaction via the network 110 of the cellblock testing devices 104, 106, and 108 with content 114, which is stored in storage 116 of the configuration service provider system 102. The content 114 may take a variety of forms, such as an online application, online storage, web service, digital images, digital audio, multimedia, and so forth. Thus, interaction with the content 114 by the cellblock testing devices 104, 106, and 108 via the network 110 may also take a variety of forms, such as selection of a menu item, voice command, gesture, selection of a hyperlink, and so forth.

The configuration test generation module 112 receives information to generate a configuration test, and automatically distributes a generated configuration test to appropriate cellblock testing devices for execution. For example, the configuration test generation module 112 may receive user inputs via a user interface that include components of a configuration test, or may receive a configuration test from a client computing device (not pictured) to be distributed to appropriate cellblock computing devices for execution. The configuration test generation module 112 may make content available to include in a configuration test from the storage 116, such as test configuration parameters 118 and test configuration scripts 120. The test configuration parameters 118 may include processing speed, hardware specifics, device operating system type and version, and so forth. The test configuration scripts 120 include instructions for how the configuration test is to be executed by the cellblock testing devices using the test configuration parameters 118.

In one example, the configuration test generation module 112 may allow a user to access the test configuration parameters 118 and the test configuration scripts 120 via a selection in a user interface, such as through menu selection, a drop down menu, input via a keyboard, and so forth. Alternatively or additionally, the configuration test generation module 112 can automatically select from the test configuration parameters 118 and/or the test configuration scripts to create a desired configuration test.

Once the configuration test generation module 112 generates a configuration test, the configuration test generation module determines which cellblocks to output the configuration test to. For example, the configuration test generation module 112 may have received a user input to perform a configuration test on all mobile devices that are executing a particular version number of an operating system. The configuration test generation module 112 automatically determines which mobile devices at which cellblocks are executing the particular version number of the operating system, and outputs the configuration test to those cellblocks via the network 110.

The cellblock testing devices 104, 106, and 108 are shown as including a cellblock testing module 122 that enables the cellblock testing devices to interact with the content 114 of the configuration service provider system 102 via the network 110. The cellblock testing devices 104, 106, and 108 can each also include one or more mobile devices 124. The mobile devices 124 may include handheld devices, mobile phones, PDAs, tablet or slate devices, and so forth. The mobile devices 124 can be housed within the cellblock testing devices 104, 106, and 108, and are communicatively coupled to the cellblock testing devices such as through USB, micro USB, HDMI, or other forms of communicative coupling.

The cellblock testing module 122 of the cellblock testing device 104 receives a request from the configuration service provider system 102 to perform a test run on multiple mobile devices 124 located at the cellblock testing device 104. As discussed above, the request includes multiple test scripts to execute the test run on each of the multiple mobile devices 124. The multiple test scripts in the request may be a subset of the test configuration scripts 120 from the storage 116 of the configuration service provider system 102.

The cellblock testing module 122 creates a thread for each of the multiple mobile devices 124 to perform the test run. For instance, the cellblock testing module 122 can initiate an Appium™ server, or other similar framework, at each port that interfaces between the cellblock testing device 104 and the mobile devices 124. Then, the cellblock testing module 122 can configure each Appium™ server for the test run using the test configuration parameters 118 that were included in the request. The cellblock testing module 122 initiates an Appium™ server for each of the mobile devices 124 indicated in the request to perform the test run, such as a first Appium™ server for a first indicated mobile device, a second Appium™ server for a second mobile device, and so forth.

The cellblock testing module 122 then performs the test run on each of the multiple mobile devices 124 located at the cellblock testing device 104 simultaneously via each of the threads. Performing the test run by the cellblock testing module 122 includes executing a test script, such as one of the test configuration scripts 120, on each of the respective multiple mobile devices 124.

While the cellblock testing module 122 performs the test run, the cellblock testing module also monitors the multiple mobile devices 124 as the test run is performed for results of the test run. Monitoring for results of the test run by the cellblock testing module 122 may include video capture of the multiple mobile devices 124, screen shots of the multiple mobile devices, performance metrics of the multiple mobile devices, network activity of the multiple mobile devices, and so forth. The cellblock testing module 122 performs the test run simultaneously on each of the multiple mobile devices 124, and consequently, the cellblock testing module monitors each of the multiple mobile devices simultaneously as the test run is performed. Results of the test run can be communicated from each of the mobile devices 124 to the cellblock testing module 122 of the cellblock testing device 104 via the Appium™ server that was initiated for each of the mobile devices. Then, the cellblock testing module 122 can communicate the results of the test run to the configuration service provider system 102 via the network 110, or to other computing devices for further analysis.

After considering an example system for implementing parallel testing of multiple devices using a cellblock, consider now a description of the configuration test generation module 112 in further detail.

Figure 2:
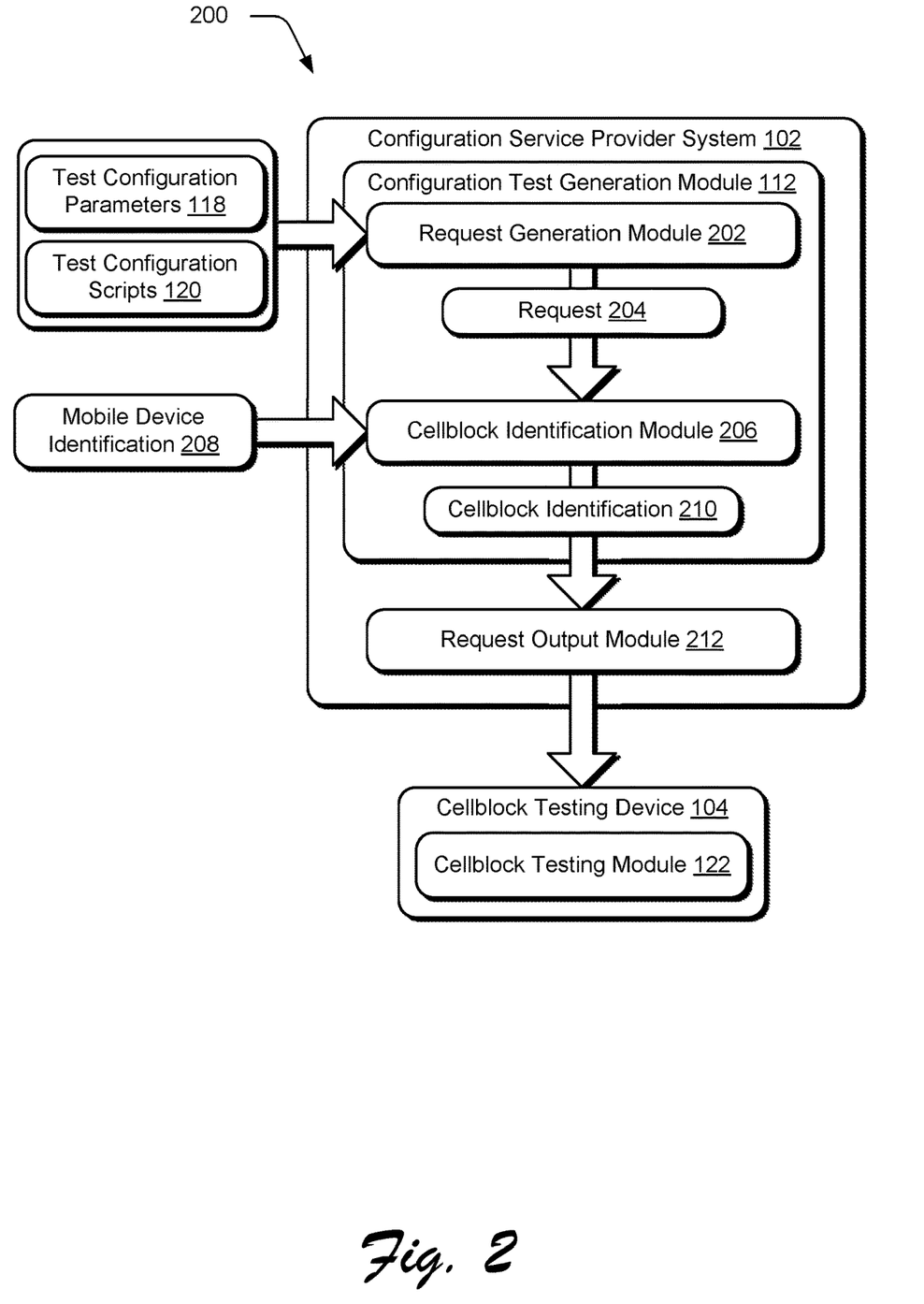
FIG. 2 depicts a system in an example implementation showing operation of a configuration test generation module of FIG. 1 in greater detail.

FIG. 2 depicts a system 200 in an example implementation showing operation of the configuration test generation module 112 of FIG. 1 in greater detail. To begin this example, test configuration parameters 118 and test configuration scripts 120 are received by a request generation module 202 of the configuration test generation module 112. A developer may interact with a user interface of the configuration service provider system 102, for instance, or may interact with a user interface of a remote client device (not pictured), to select or create test configuration parameters 118 and/or test configuration scripts 120. The request generation module 202 is configured to generate a request 204 for carrier-specific validation and testing to original equipment manufacturer (OEM) specific pre-release device compatibility and protocol testing using the inputted test configuration parameters 118 and the test configuration scripts 120.

Next, a cellblock identification module 206 receives the request 204, and receives a mobile device identification 208. The mobile device identification 208 may also be received via interaction with a user interface of the configuration service provider 102 or a user interface of a remote client device. The mobile device identification 208 can include specific devices that a developer wants to perform the test run, a selection of any devices running a particular version of an operating system that the developer wants to perform the test run, a selection of any devices operated by a particular mobile carrier that the developer wants to perform the test run, and so forth. The cellblock identification module 206 interprets the specific mobile devices identified in the mobile device identification 208, and identifies which cellblocks contain the mobile devices indicated in the mobile device identification.

As discussed above, a developer may desire to perform a test run on mobile devices located at different cellblocks. The cellblock identification module 206 outputs a cellblock identification 210 identifying which cellblocks contain the mobile devices identified in the mobile device identification 208. The cellblock identification module 206 can further include the cellblock identification 210 in the request 204. Therefore, the developer only needs to identify which devices, or a category of devices, the developer wishes to perform the test run without needing to know exactly where the particular mobile devices are located.

A request output module 212 of the configuration service provider system 102 outputs the request 204 to the appropriate cellblock testing device(s) 104 based on the cellblock identification 210. The request 204 may include different test configuration parameters 118 and/or different test configuration scripts 120 to be executed on different mobile devices identified in the mobile device identification 208. If so, the request output module 212 interprets the mobile device identification 208 for the parameters 118 and scripts 120 and sends the appropriate parameters and scripts to the applicable cellblock testing device(s) 104. Outputting the request 204 based on the cellblock identification 210 enables the cellblock testing module 122 of the cellblock testing device 104 to run the test configuration scripts 120 on the indicated multiple mobile devices simultaneously based on the test configuration parameters 118.

Having considered an example implementation of a configuration test generation module, consider now a description of the cellblock testing module 122 in further detail.

Figure 3:
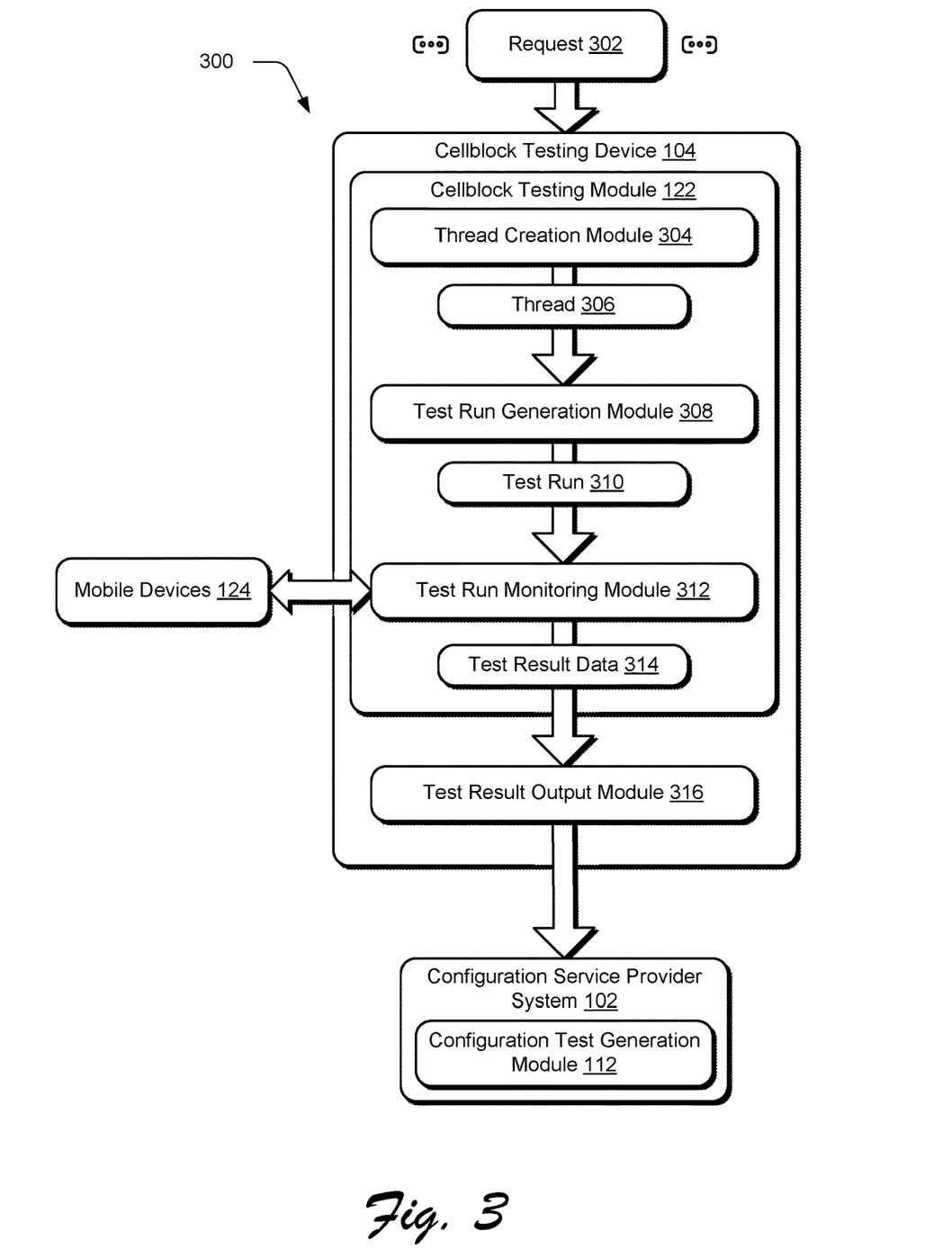
FIG. 3 depicts a system in an example implementation showing operation of a cellblock testing module of FIG. 1 in greater detail.

FIG. 3 depicts a system 300 in an example implementation showing operation of the cellblock testing module 122 of FIG. 1 in greater detail. To begin this example, a thread creation module 304 of the cellblock testing module 122 receives a request 302 to perform a test run on multiple mobile devices located at the cellblock testing device 104. The request 302 includes multiple test scripts to execute the test run on each of the multiple mobile devices indicated in the request 302. The thread creation module 304 analyzes the request 302, and determines which of the mobile devices located at the cellblock testing device 104 are to perform the test run.

For each of the mobile devices that are to perform the test run based on the request 302, the thread creation module 304 generates a thread 306 to perform the test run. The thread creation module 304 can initiate an Appium™ server, or similar framework, for each of the mobile devices indicated in the request 202 as part of generating the thread 306. The thread creation module 304 can also identify a port of the cellblock testing device 104 where the mobile devices identified in the request 302 are connected to the cellblock testing device. When the thread creation module 304 identifies the applicable ports that connect the cellblock testing device 104 to the mobile devices, the thread creation module can configure the Appium™ server for the mobile devices at each respective port of the cellblock testing device.

A test run generation module 308 determines that the thread 306 has been created and generates a test run 310 to be run on the mobile devices that were indicated in the request 302. The test run 310 generated by the test run generation module 308 also includes the test scripts included in the request 302 that are to be run on the mobile devices located at the cellblock testing device 104. As part of the test run 310, the test run generation module 308 configures dependencies for each test script included in the request 302. The dependencies may be based on test configuration parameters that were included in the request 302. The dependencies may include configuring Android™ package (APK) files, identifying Java™ and other libraries (TestNG™ libraries, Selenium™ libraries, Appium™ libraries, and so forth), identifying file paths, and other dependencies that may be used by each test script in executing the test run.

When the test run generation module 308 generates the test run 310, a test run monitoring module 312 performs the test run on the mobile devices 124 indicated in the request 302 that are located at the cellblock testing device 104. The test run monitoring module 312 performs the test run 310 on each of the mobile devices 124 located at the cellblock testing device 104 simultaneously via each thread 306, including executing a test script included in the request 302 on each of the mobile devices 124 indicated in the request. For example, a first Appium™ server of the test run monitoring module 312 can communicate to a first mobile device 124 via a first setup port to run a first test script, a second Appium™ server of the test run monitoring module can communicate to a second mobile device via a second setup port to run a second test script, and so forth.

The test run monitoring module 312 additionally monitors the mobile devices 124 as the test run 310 is performed for test result data 314. The test result data 314 can include video capture of the mobile devices 124, screen shots of the mobile devices, performance data of the mobile devices, network activity of the mobile devices, and so forth. A test result output module 316 receives the test result data 314, such as continuously as the test run 310 is performed by the test run monitoring module 312, or upon completion of the test run by the test run monitoring module. The test result output module 316 outputs the test result data 314 to the configuration service provider system 102 for further analysis of the test result data. The test result data 314 that is output to the configuration service provider system 102 includes the results of the test run 310 that was executed simultaneously on the multiple mobile devices 124, providing multifaceted and accurate test results that were not available with previous systems that performed tests on mobile devices in series.

Having considered an example of the cellblock testing module, consider now a description of example additional features of the configuration service provider system 102 and the cellblock testing devices 104, 106, and 108 in further detail.

Figure 4:
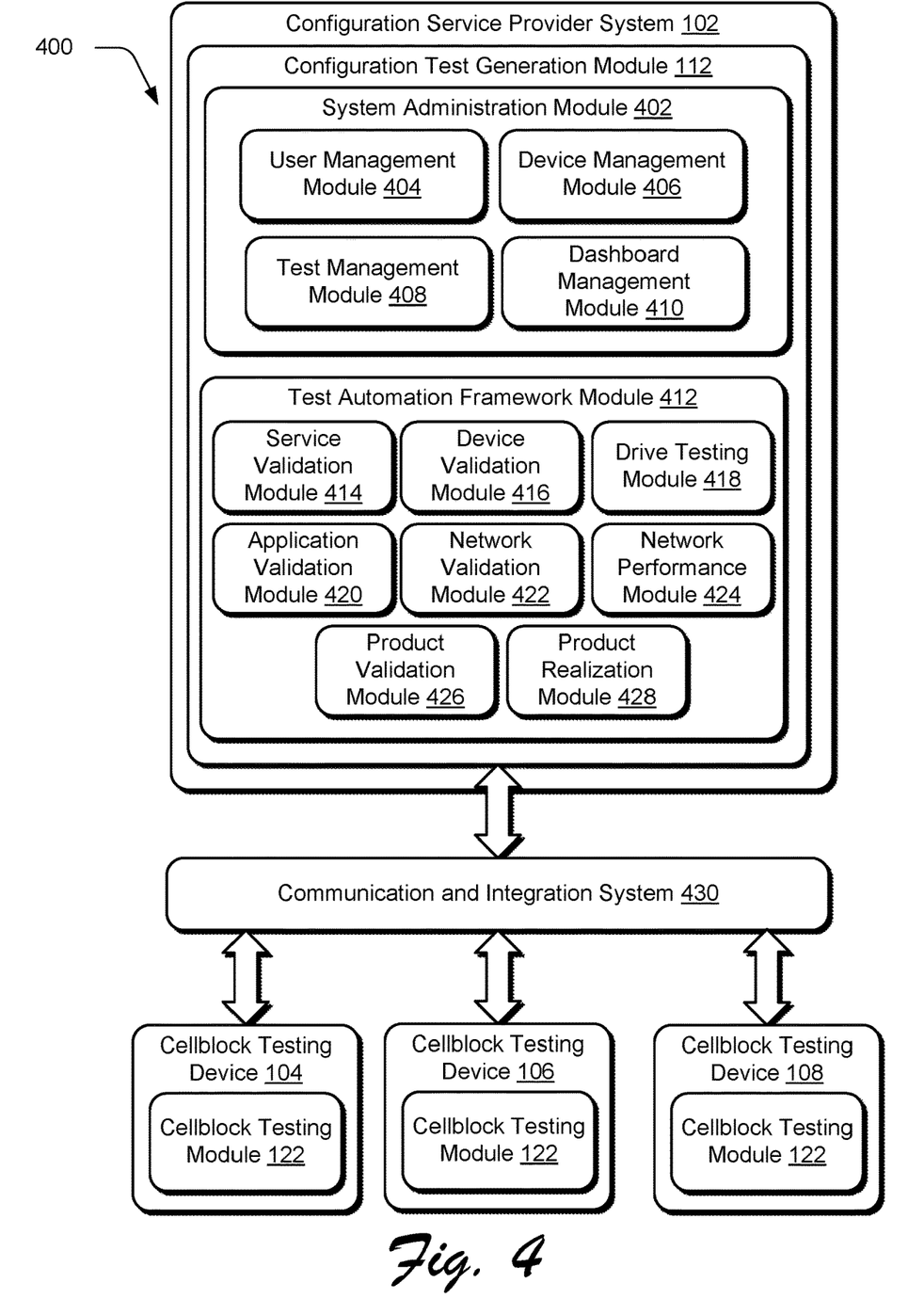
FIG. 4 depicts a system in an example implementation showing interaction of the service provider system and the cellblock device of FIG. 1 in greater detail.

FIG. 4 depicts examples of additional features and functionalities that may be used in an example implementation of parallel testing of multiple mobile devices using a cellblock testing device. The configuration test generation module 112 of FIG. 1 is shown including a system administration module 402 that enables management of configuration testing of cellblocks that the configuration service provider system has access to. The system administration module 402 may be part of a platform for managing hardware and/or software aspects of mobile devices.

The system administration module 402 is shown as including a user management module 404, a device management module 406, a test management module 408, and a dashboard management module 410. The user management module 404 includes functionality to provide a user interface for user creation of configuration tests, and/or functionality to receive configuration tests created by users at remote computing devices. The device management module includes functionality to identify and locate different mobile devices and interface with multiple cellblocks. The test management module includes functionality to distribute configuration tests to appropriate cellblocks and mobile devices and receive and analyze configuration test results. The dashboard management module includes functionality to display cellblocks and mobile devices located at respective cellblocks, and display configuration test results in a user interface.

The configuration test generation module 112 is also shown as including a test automation framework module 412. The test automation framework module 412 provides functionality for configuration and testing of multiple aspects of mobile devices by providing device- and carrier-specific configuration parameters using different modules. Examples of possible modules that may be included in the test automation framework module are discussed below.

The test automation framework module 412 can include a service validation module 414 to ensure that deployed releases of applications, updates, operating systems, and so forth, and the resulting services of these releases, meet customer expectations. The service validation module 414 further verifies that network operations are able to support the new releases. To do so, the service validation module 414 can provide configuration parameters and scripts for functional and usage testing for core mobile device applications such as SMS, call hold, call transfer, and so on. The service validation module 414 can also provide configuration parameters and scripts part of a test run for wireless Internet applications on mobile devices mobile portals, voice portals, location-based services, and SMS-based applications, to name some examples.

The test automation framework module 412 can also include a device validation module 416 to ensure the quality of mobile device hardware and software. To do so, the device validation module 416 can provide configuration parameters and scripts for testing mobile device features, integration of the mobile device, a system test following an integration test, application test, over-the-air (OTA) tests, battery drain tests, stability tests, usability tests, and so forth.

Additionally, the test automation framework module 412 can include a drive testing module 418 which provides support for call control of mobile device networks (e.g., 2G, 3G, 4G, 4G LTE, and so on), including the capability of sending and recording voice, testing video conferencing, and testing a variety of data over the mobile devices, while analyzing performance of the mobile devices. The drive testing module 418 can provide configuration parameters and scripts as part of a test run for signal intensity, signal quality, interference, dropped calls, blocked calls, anomalous events, call statistics, service level statistics, quality of service information, handover information, neighboring cell information, GPS location coordinates, and so forth.

The test automation framework module 412 can further include an application validation module 420 to protect users of an application and the vendor of the application from software that does not work properly or exhibits malicious behavior. Keeping application validation up-to-date is critical because there are a large number of mobile devices with diverse features and platforms which are upgraded frequently, and also a high cost and complexity associated with mobile device application compatibility testing. The application validation module 420 can provide configuration parameters and scripts as part of a test run for install and launch of an application, memory use, connectivity, event handling, messaging and calls, external influence, user interface, language, performance, media, menu options, functionality, keys, stability, data handling, security, metadata, privacy and user permissions, and network and battery usage performance.

In addition, the test automation framework module 412 can include a network validation module 422 ascertain limits of network infrastructure for the support of mobile devices. To do so, the network validation module 422 can provide configuration parameters and scripts as part of a test run for testing the network from a subscriber's point of view, testing end-to-end or mobile-to-land aspects of the system, benchmark performance against competitor networks, testing specific routes and/or location areas, testing in-building coverage for specific buildings, and so forth. The configuration parameters and scripts provided by the network validation module 422 provide insight to an application's performance on networks, help to identify various application and infrastructure bottlenecks, validate the response time of the application, validate battery consumption, how resources are consumed by functionality such as GPS, switching from WiFi to 3G/4G, and so on.

Furthermore, the test automation framework module 412 can include a network performance module 424 measure and benchmark the performance of mobile networks for the quality of experience and service for users. The network performance module 424 may seek results similar to those sought by the network validation module 422 and/or the drive testing module 418, including repeating some test scripts of these modules but with different configuration parameters and metrics. For example, the network performance module 424 can provide configuration parameters and scripts for upload and download of content speed analysis, latency, packet loss, signal strength, and so forth.

The test automation framework module 412 can also include a product validation module 426 to check a mobile device's behavior against a set of infrastructure in live networks. The product validation module 426 can provide a set of configuration parameters and scripts for interoperability testing (e.g., 2G, 3G, 4G networks), field testing, PCS Type Certification Review Board (PCTRB) testing, OTA testing, performance testing, and so on.

Additionally, the test automation framework module 412 can include a product realization module 428 to execute a complete life cycle of a product. For instance, the product realization module 428 can combine market requirements, resources, and technical capabilities to define new products and services to end users. The product realization module 428 defines requirements for products and services, tests the operator ecosystem including call flows for mobile devices to support new services, features, and/or applications. Further, the product realization module 428 can utilize configuration parameters and scripts that integrate with the service validation module 414, the device validation module 416, the application validation module 420, the network validation module 422, and so forth.

The configuration parameters and scripts provided by the product realization module 428 can provide mobile device feature tests, integration tests, system tests that can follow integration tests, application tests, OTA tests, stability tests, data handling, security tests, metadata tests, privacy and user permission tests, network performance tests, battery usage tests, upload and download of content speed analysis, latency analysis, packet loss detection, signal strength analysis, quality of service information, handover information, neighboring cell information, GPS location coordinates, testing a network from a subscriber's point of view, testing end-to-end or mobile-to-land aspects of the system, benchmark performance against competitor networks, testing specific routes and/or location areas, testing in-building coverage for specific buildings, testing for operating system support (OSS) or business system support (BSS) systems like billing, mediation, CRM, and so forth.

The functionality provided by the modules 402-428 are configured to generate requests for test runs to be performed on multiple mobile devices simultaneously. A test run request includes test configuration parameters and test scripts from one or more of the modules 414-428 that the multiple mobile devices will use to perform the test run. Once the test run request is generated by the configuration test generation module 112, a communication and integration system 430 determines which mobile devices located at which cellblocks 104, 106, and 108 are to perform the test run.

For instance, the communication and integration system 430 can receive user input via a user interface from the system administration module 402 indicating which devices are to perform the test run, and distributes the test run request based on information on the locations of mobile devices from the device management module 406. The communication and integration system 430 can also analyze the test configuration parameters and test scripts included in the test run request, and distribute the test run request to cellblock testing devices 104, 106, and 108 that contain mobile devices that have components or applications that are able to be tested by the test configuration parameters and test scripts contained in the test run request. The communication and integration system 430 can also receive test run result data from the cellblock testing module 122 of each of the cellblock testing devices 104, 106, and 108 and distribute this test result data to the system administration module 402 for further analysis.

Having considered example systems for the implementation of parallel testing of multiple devices using a cellblock, consider now example procedures which may be executed by the described systems for parallel testing of multiple mobile devices using a cellblock in accordance with one or more implementations.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
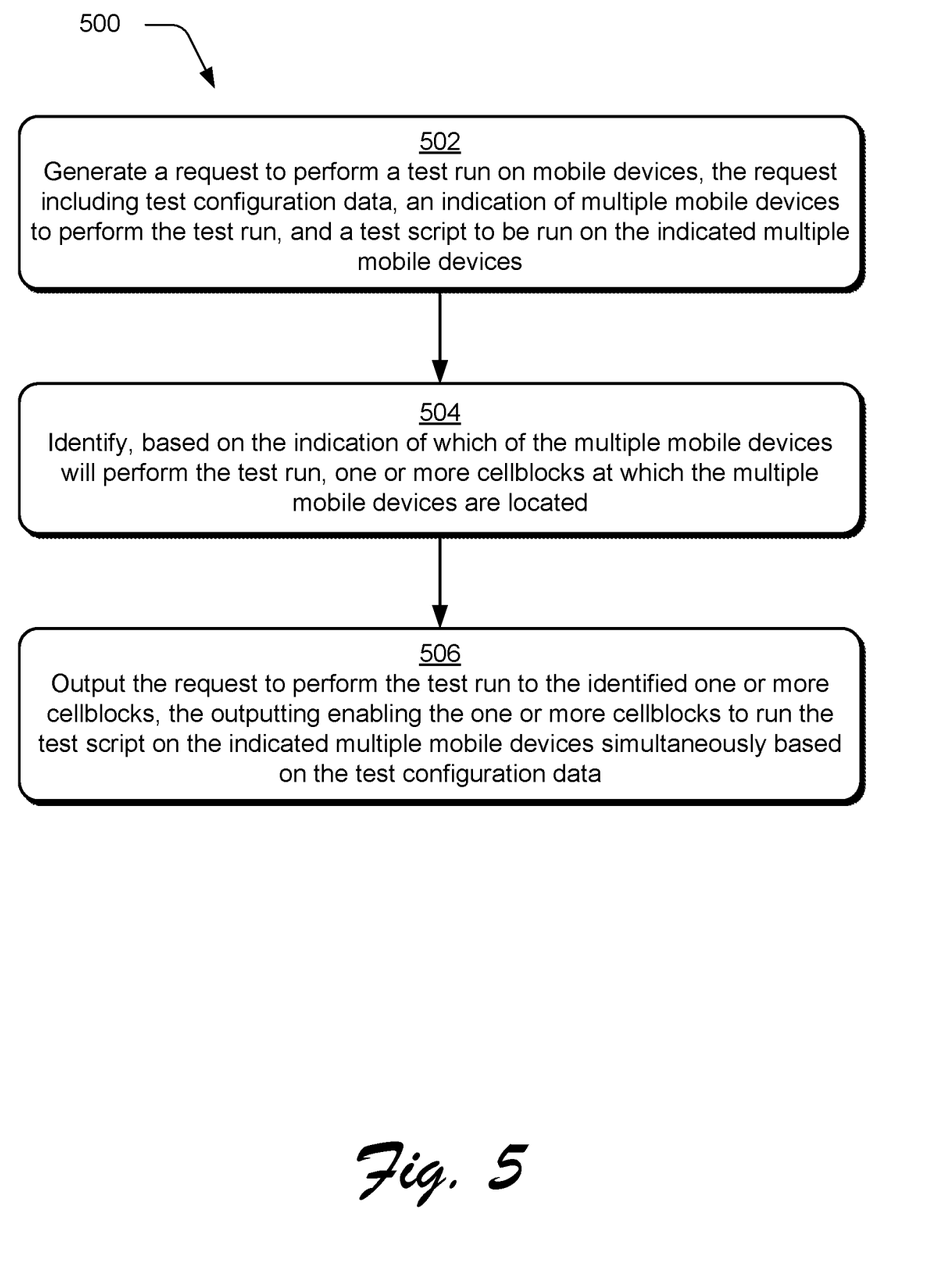
FIG. 5 is a flow diagram depicting a procedure in an example implementation in which a request to perform a test run is generated in accordance with one or more implementations.

FIG. 5 depicts a procedure 500 in an example implementation in which a request to perform a test run on mobile devices is generated and output to appropriate cellblocks. First, the request is generated including test configuration data, an indication of multiple mobile devices to perform the test run, and a test script to be run on the indicated multiple mobile devices (block 502). The test configuration data can include test configuration parameters 118 as discussed above. For example, the configuration test generation module 112 can generate the request to perform the test run using test configuration data and/or test scripts from the service validation module 414, the device validation module 416, the drive testing module 418, the application validation module 420, the network validation module 422, the network performance module 424, the product validation module 426, the product realization module 428, and/or additional modules not described herein. The indication of multiple mobile devices to perform the test run may be received via user input with a user interface indicating specific devices, or may be interpreted by the configuration test generation module 112 automatically based on the test configuration data included in the request, the test script included in the request, or other information.

One or more cellblocks are identified at which the multiple mobile devices are located based on the indication of which of the mobile devices will perform the test run (block 504). Accordingly, only cellblocks that house one or more of the devices indicated in the request will receive the request to perform the test run. Once the one or more cellblocks are identified, the request to perform the test run is output to the cellblocks (block 506). Outputting the request enables the one or more cellblocks to run the test script on the indicated multiple mobile devices simultaneously based on the test configuration data. The test script can be run simultaneously on multiple mobile devices at a single cellblock, or can be run simultaneously on mobile devices at different cellblocks, based on the test configuration data.

Figure 6:
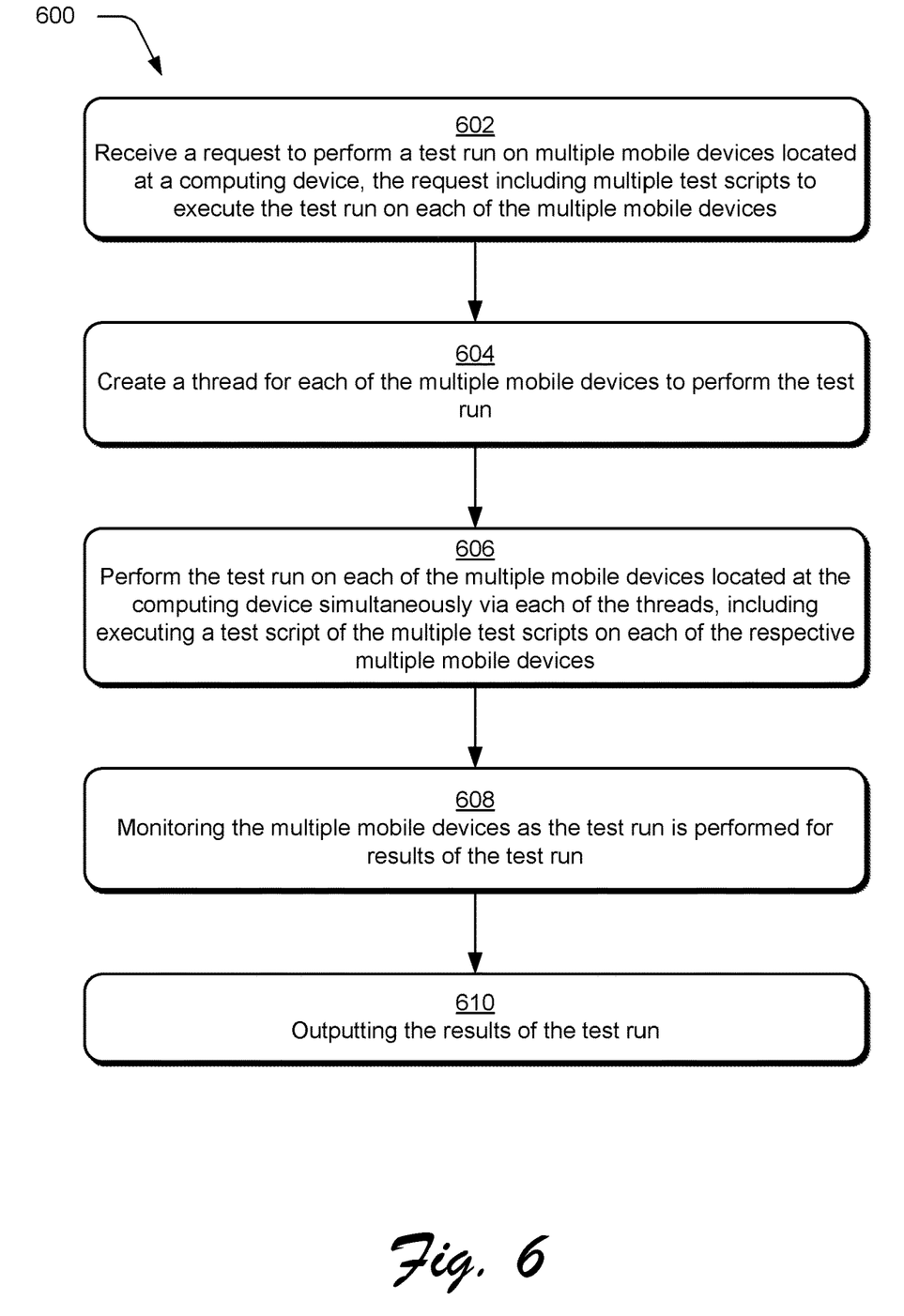
FIG. 6 is a flow diagram depicting a procedure in an example implementation in which a test run is performed on multiple mobile devices based on a received request in accordance with one or more implementations.

FIG. 6 depicts a procedure 600 in an example implementation in which a test run is performed on multiple mobile devices simultaneously at a cellblock. First, a request to perform a test run on multiple mobile devices located at a computing device is received (block 602). The request includes multiple test scripts to execute the test run on each of the multiple mobile devices. The computing device can be a cellblock that is configured to perform the test run on multiple devices located at the cellblock. The request may be received from the configuration service provider system 102 as part of a group of requests that were sent to multiple cellblocks 104, 106, and 108 to perform the test run.

A thread is created for each of the multiple mobile devices to perform the test run (block 604). For example, the thread creation module 304 can analyze the request and determine which of the mobile devices located at the cellblock testing device 104 are to perform the test run. Then, the thread creation module 304 creates a thread for each mobile device indicated in the request to perform the test run. The thread creation module 304 can also configure an Appium™ server for the particular ports of the cellblock testing device that connect the cellblock testing device to the respective mobile devices as part of creating the threads.

Next, the test run is performed on each of the multiple mobile devices located at the computing device simultaneously via each of the threads (block 606). Performing the test run includes executing a test script of the multiple test scripts received in the request on each of the respective multiple mobile devices, thus performing the test run in parallel on the multiple mobile devices. In an example, the test run generation module 308 configures an Appium™ server for each of the ports where the respective mobile devices to be tested are connected to the cellblock testing device 104. The test run generation module 308 also configures dependencies for each test script included in the request, such as configuring APK files, identifying Java™ and other libraries, identifying file paths, and so forth. When the Appium™ server and dependencies are configured for each of the multiple mobile devices, the test run monitoring module 312 performs the test run on each of the mobile devices simultaneously via each thread, including executing a test script included in the request on each of the mobile devices indicated in the request.

While the test run is performed on each of the multiple mobile devices, the multiple mobile devices are monitored for results of the test run (block 608). The test run monitoring module 312 can generate test result data 314 such as video capture of the mobile devices, screen shots of the mobile devices, performance data of the mobile devices, network activity of the mobile devices, and so forth. Then, the results of the test run are output (block 610), such as continuously as the test run is performed by the test run monitoring module 312, or upon completion of the test run by the test run monitoring module.

Having described the embodiments above, consider now an example system that can be utilized to implement one or more of the above-described embodiments.

Example System and Device

Figure 7:
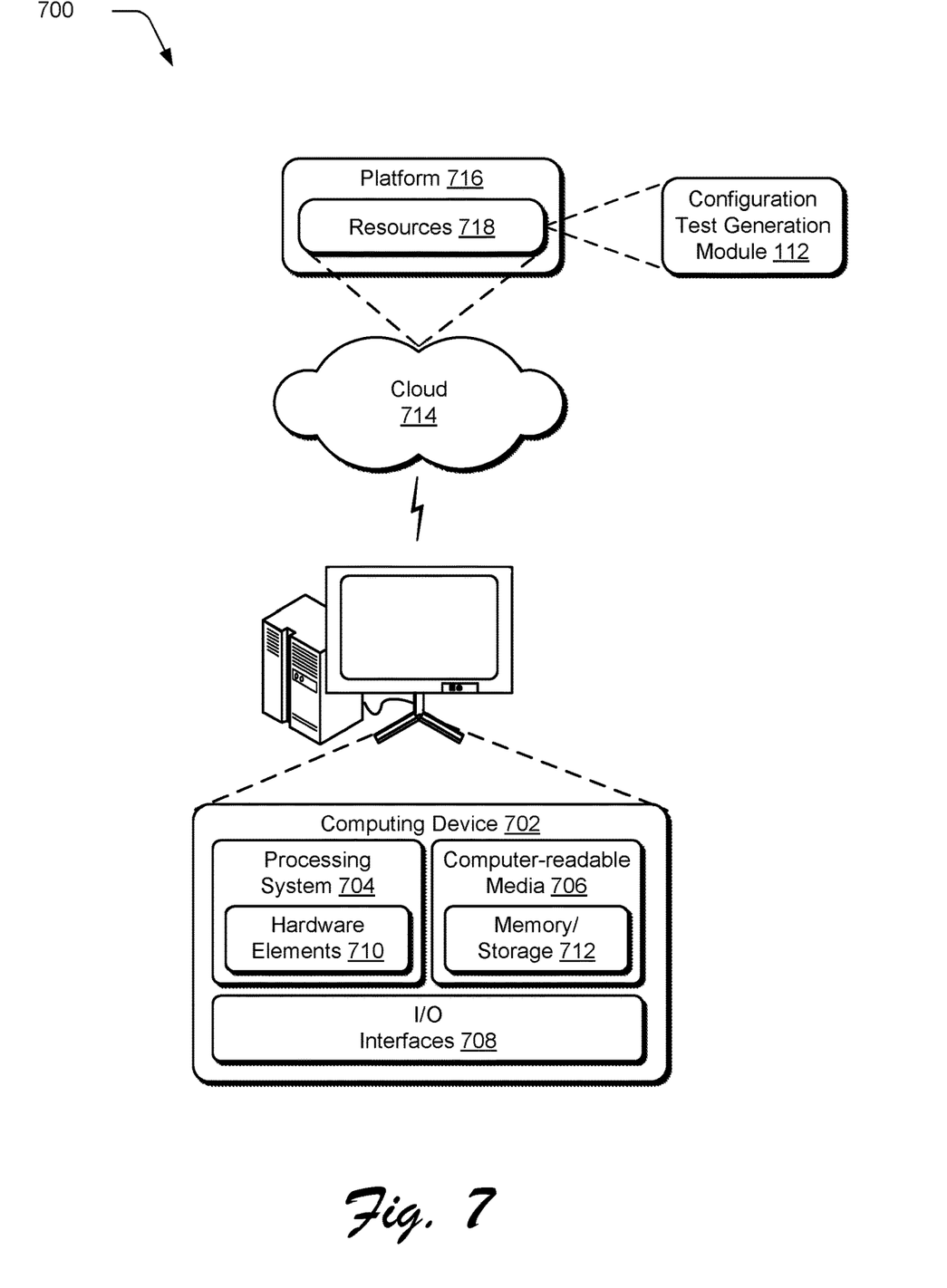
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the configuration test generation module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
generating a request to perform a test run on mobile devices, the request including test configuration data, a device attribute of mobile devices to perform the test run, and a test script to be run on the indicated multiple mobile devices, one or more of the test configuration data or the test script being based at least in part on carrier data identifying carrier-specific validation and testing to original equipment manufacturer (OEM) specific device compatibility and protocol testing;
identifying, based on the device attribute of the mobile devices to perform the test run, one or more cellblocks at which the mobile devices are located, said identifying including:
identifying a first cellblock at which a first set of mobile devices that exhibit the device attribute are located; and
identifying a second cellblock at which a second set of mobile devices that do not exhibit the device attribute are located; and
outputting the request to perform the test run to the first cellblock and disregarding the second cellblock for the test run, the outputting enabling the first cellblock to run the test script on the first set of mobile devices simultaneously based on the test configuration data.

2. The computer-implemented method of claim 1, wherein the test configuration data includes test configuration parameters for the indicated multiple mobile devices, and wherein the test script to be run on the indicated multiple mobile devices includes instructions for how the test run is to be executed by the identified one or more cellblocks using the test configuration parameters.

3. The computer-implemented method of claim 1, wherein the test script describes actions to be performed by the indicated multiple mobile devices during the test run.

4. The computer-implemented method of claim 1, wherein the device attribute includes a particular mobile carrier to be used to perform the test run, the carrier data being based on the particular mobile carrier.

5. The computer-implemented method of claim 1, wherein the carrier data is specific to pre-release device compatibility and protocol testing for an OEM device.

6. The computer-implemented method of claim 1, wherein the device attribute identifies mobile devices operated by a specific wireless mobile carrier associated with the carrier data.

7. A system comprising:
at least one processor; and
one or more computer-readable storage media including instructions stored thereon that, responsive to execution by the at least one processor, cause the system to perform operations including:
receiving, at the computing device, a request to perform a test run on multiple mobile devices, the request including a first set of test configuration parameters and a second set of configuration parameters, and a first test script and a second test script one or more of the first set of test configuration parameters or the second set of configuration parameters being based at least in part on carrier data identifying carrier-specific validation and testing to original equipment manufacturer (OEM) specific device compatibility and protocol testing;
creating a thread for each of the multiple mobile devices to perform the test run including creating a first thread configured based on the first script and the first set of test configuration parameters, and a second thread configured based on the second script and the second set of test configuration parameters;
performing the test run on each of the multiple mobile devices via each of the threads, including executing the first test script at a first mobile device of the multiple mobile devices and based on the first thread, and executing the second test script at a second mobile device of the multiple mobile device and based on the second thread;
monitoring the multiple mobile devices as the test run is performed for results of the test run; and
outputting the results of the test run.

8. The system of claim 7, wherein the multiple mobile devices are housed within the computing device.

9. The system of claim 7, wherein the creating the thread for each of the multiple mobile devices includes initiating servers at ports that interface between the computing device and the multiple mobile devices.

10. The system of claim 7, wherein the monitoring the results of the test run includes one or more of capturing video of the multiple mobile devices, capturing screen shots of the multiple mobile devices, capturing performance metrics of the multiple mobile devices, and capturing network activity of the multiple mobile devices.

11. The system of claim 7, wherein the request to perform a test run on the multiple mobile devices is received from a remote source, each of the multiple mobile devices are communicatively coupled to the computer device via a respective wired connection, and wherein said performing the test run comprises communicating the respective threads to the respective mobile devices via a respective wired connection.

12. A computer-implemented method comprising:
  receiving, at a computing device, a request to perform a test run on multiple mobile devices located at the computing device, the request being based at least in part on carrier data identifying carrier-specific validation and testing to original equipment manufacturer (OEM) specific device compatibility and protocol testing, and including:
    a first set of test configuration parameters and a second, different set of test configuration parameters for the multiple mobile devices indicated in the request; and
    a first test script and a second, different test script to execute the test run on each of the multiple mobile devices;
  creating a thread for each of the multiple mobile devices to perform the test run including creating a first thread configured based on the first script and the first set of test configuration parameters, and a second thread configured based on the second script and the second set of test configuration parameters;
  performing the test run on each of the multiple mobile devices located at the computing device simultaneously and according to the test configuration parameters via each of the threads, including executing the first test script at a first mobile device of the multiple mobile devices and based on the first thread, and executing the second script at a second mobile device of the multiple mobile device and based on the second thread;
  monitoring the multiple mobile devices as the test run is performed for results of the test run; and
  outputting the results of the test run.

13. The computer-implemented method of claim 12, wherein creating the thread for each of the multiple mobile devices includes determining which mobile device is to perform the test run according to the first test script, and which mobile device is to perform the test run according to the second test script.

14. The computer-implemented method of claim 12, wherein the performing the test run on each of the multiple mobile devices further includes configuring dependencies for the multiple test scripts included in the request.

15. The computer-implemented method of claim 1, wherein the test configuration data comprises test configuration parameters including one or more of processing speed or hardware specifics to be used for performing the test run.

16. The computer-implemented method of claim 1, wherein the device attribute identifies a first device type and a second device type to be used for performing the test run, and wherein said identifying the first cell block comprises determining that the first cell block includes at least one mobile device of the first device type, and at least one mobile device of the second device type.

17. The computer-implemented method of claim 16, wherein the test script includes a first test script to be executed on the first device type, and a second test script to be executed on the second device type.

18. The method of claim 12, wherein the first set of configuration parameters includes a first device attribute and the second set of configuration parameters includes a second device attribute, and wherein the method further comprises selecting the first mobile device based on the first mobile device exhibiting the first device attribute, and selecting the second mobile device based on the second mobile device exhibiting the second device attribute.

19. The system of claim 11, wherein the request to perform a test run on the multiple mobile devices is received via a wireless connection from the remote source, and wherein one or more of the wired connections comprises a Universal Serial Bus (USB) connection.

20. The computer-implemented method of claim 12, wherein the request to perform the test identifies a particular mobile carrier associated with the carrier data, and wherein the method further comprises:
  selecting the multiple mobile devices to perform the test based on the multiple mobile devices being operated by the particular mobile carrier; and
  disregarding one or more other mobile devices for the test based on the one or more other devices not being operated by the mobile carrier.

* * * * *